US007127061B2

(12) United States Patent
Gregorius

(10) Patent No.: US 7,127,061 B2
(45) Date of Patent: Oct. 24, 2006

(54) LINE DRIVER FOR DIGITAL SIGNAL TRANSMISSION

(75) Inventor: Peter Gregorius, Munich (DE)

(73) Assignee: Infineon Technologies AG, Munich (DE)

( * ) Notice: Subject to any disclaimer, the term of this patent is extended or adjusted under 35 U.S.C. 154(b) by 126 days.

(21) Appl. No.: 10/755,696

(22) Filed: Jan. 12, 2004

(65) Prior Publication Data

US 2004/0165719 A1 Aug. 26, 2004

Related U.S. Application Data

(63) Continuation of application No. PCT/DE02/02090, filed on Jun. 7, 2002.

(30) Foreign Application Priority Data

Jul. 19, 2001  (DE)  ................... 101 35 113

(51) Int. Cl.
*H04M 19/00*  (2006.01)
(52) U.S. Cl. .................. 379/399.01; 379/324
(58) Field of Classification Search ........... 379/399.01, 379/413, 322–324; 330/267, 270, 290, 255, 330/130, 129
See application file for complete search history.

(56) References Cited

U.S. PATENT DOCUMENTS

| 4,088,843 | A | * | 5/1978 | Rogers et al. | ............... | 379/324 |
| 5,585,763 | A | * | 12/1996 | Navabi et al. | ............... | 330/255 |
| 6,028,479 | A | * | 2/2000 | Babanezhad | ................ | 330/253 |

FOREIGN PATENT DOCUMENTS

DE   37 89 915 T2  * 12/1994
EP   0 969 633 A2  *  6/1999
EP   1 039 702 A1  *  3/2000
WO   WO99/45656    *  9/1999

OTHER PUBLICATIONS

"Halbleiter-Schaltungstechnik", U. Tietze et al., 11th edition, Berlin, Spring, pp. 821-828, ISBN 3-540-64192-0, 1999.*
"A 100-MHZ, 50-Ω, -45-dB Distortion, 3.3-V CMOS Line Drive for Ethernet and Fast Ethernet Networking Applications"; J.N. Babanezhad, IEEE Journal of Solid-State Circuits, vol. 34, pp. 1044-1050, 1999.*
"A Differential 160 MHz Self-Terminating Adaptive CMOS Line Driver"; R. Mahadevan et al., IEEE Journal of Solid-State Circuits, vol. 35, pp. 1889-1894, Dec. 12, 1998.*
"A CMOS Transceiver for 10-Mb/s and 100-Mb/s Ethernet"; J.A. Everitt et al., IEEE Journal of Solid-State Circuits, vol. 33, pp. 2169-2177, Dec. 12, 1998.*
"A 3.3-V, Low-distortion ISDN Line Driver with a Novel Quiescent Current control Circuit"; H. Casier et al., IEEE Journal of Solid-State Circuits, vol. 33, No. 7, pp. 1130-1133, Jul. 1998.*

(Continued)

*Primary Examiner*—Sinh Tran
*Assistant Examiner*—Walter F Briney, III
(74) *Attorney, Agent, or Firm*—Baker Botts L.L.P.

(57) ABSTRACT

In a line driver an input current (IINN) feeds a node (K1) which is connected to an input on an amplifier (OTA1). A further input on the amplifier (OTA1) has a reference voltage (VSGND) applied to it. The amplifier (OTA1) controls a current source (MN1) which outputs an output current (IOUTN). A current/voltage converter (R1) is connected between the node (K1) and the current source (MN1). A voltage/current converter (R2) is connected between the current source (MN1) and a ground (VSS).

34 Claims, 9 Drawing Sheets

OTHER PUBLICATIONS

"Analog Line Drive with Adaptive Impedance Matching"; Bram Nauta et al., IEEE Journal of Solid-State Circuits, vol. 33, No. 12., pp. 1992-1998, Dec. 1998.*

"A CMOS Current Schmitt Trigger with Fully Adjustable Hysteresis"; Z. Wang, IEEE Electronic Letters, vol. 25, No. 6, pp. 397-398, Mar. 16, 1989.*

* cited by examiner

LINE DRIVER FOR DIGITAL SIGNAL TRANSMISSION

CROSS REFERENCE TO RELATED APPLICATION

This application is a continuation of copending International Application No. PCT/DE02/02090 filed Jun. 7, 2002 which designates the United States, and claims priority to German application DE101 35 113.5 filed Jul. 19, 2001.

TECHNICAL FIELD OF THE INVENTION

The invention relates to a line driver. In particular, the invention relates to a pseudo-differential line driver for digital signal transmission.

DESCRIPTION OF THE RELATED ART

To transmit digital signals from one integrated circuit to a further integrated circuit without corruption, it is necessary to ensure that the connecting lines do not impair the signals. The influence of the connecting lines is not negligible if, for steep signal edges, the propagation time through the connecting lines is at least in the order of magnitude of the circuit's rise time. A simple connecting wire between the circuits is no longer sufficient in this case. To avoid serious signal deformations, lines having a defined characteristic impedance are used which are terminated with their characteristic impedance. Frequently, two insulated wires twisted together are used for this purpose. Such lines are called twisted pair lines. A twisted pair line with approximately 100 spirals per meter has a characteristic impedance of approximately 110 Ω. The small terminating resistance means that the transmitter needs to deliver a correspondingly high output current. To satisfy this requirement, line drivers are used as transmitters or drivers. For the purpose of signal transmission which is not susceptible to noise, line drivers are frequently configured such that they feed the two wires in the twisted pair lines with symmetrical, complementary signals. The receiver used is a comparator. In the case of this mode of operation, the information is determined by the polarity of the differential signal and not by the absolute value of the level. In this context, a noise pulse merely brings about common-mode driving, which remains without effect on account of the difference formation in the comparator.

FIG. 1 shows a pseudo-differential line driver LT. The pseudo-differential line driver LT has differential amplifiers DV1 and DV2. The inverting inputs of the differential amplifiers DV1 and DV2 are fed by input currents IINN and IINP. The input currents IINN and IINP appear in pulsed form and contain the information which is to be transmitted. The input currents IINN and IINP are identical in terms of their time characteristics and also in terms of magnitude of their amplitudes, and they differ only in that they have different arithmetic signs. The noninverting inputs of the differential amplifiers DV1 and DV2 have a reference voltage VREF applied to them. The differential amplifiers DV1 and DV2 are connected up as current/voltage converters with feedback resistors RKW1 and RKW2. The outputs of the differential amplifiers DV1 and DV2 feed an external load in the form of a transformer TF and a twisted pair line TPL. To this end, the primary-side inputs of the transformer TF are connected to the outputs of the differential amplifiers DV1 and DV2, so that the transformer TF can transmit the signals to the twisted pair line TPL connected downstream of it.

The transmission of digital signals via a cable places particular importance on the interfaces between the individual transmission elements, the "line interface units". A fundamental transmission element in this context is the line driver. Particularly when cable lengths vary, it is difficult to meet high demands on the linearity and speed or bandwidth while simultaneously observing the pulse masks of the standard used.

Most conventional line drivers are based on voltage processing of the signal, i.e. a voltage signal is applied via the external load. These line drives are often based on shunt-shunt feedback systems or series-shunt feedback systems. In a shunt-shunt feedback system, the input signal source is connected in parallel with the input resistor, and the fed-back signal is connected in parallel with the input current source. By contrast, in a series-shunt feedback system, the fed-back signal is connected in series with the input signal source.

Conventional line drivers, in which the signal is transmitted in the form of a current through the external load, are usually based on current mirror circuits. The fundamental drawbacks of these line drivers are inadequate linearity of the transfer characteristic in the audio frequency domain and distortions in the radio frequency range. The distortions in the radio frequency domain are caused by Miller compensations (pole splitting), which are required for stabilization. The Miller compensations reduce the bandwidth of the amplifier, as a result of which the distortions in the radio frequency signal are caused. Compensating for the distortions in turn results in a higher drawn current.

Other approaches to the design of line drivers are based on the shunt-series feedback principle. If these line drivers are essentially based on current mirror designs, inadequate linearities are the result. In addition, the line drivers frequently have a low input resistance, which causes an increased fault current both in the audio frequency signal domain and in the radio frequency signal range. Other frequent drawbacks of the line drivers based on the shunt-series feedback principle are low open-loop gains and internal conversion of the current input signal into a voltage signal. This makes these line drivers unsuitable for low supply voltages.

Another drawback of all line drivers hitherto is often inadequate power efficiency.

The publication "A 100-MHz, 50-Ω, −45-dB Distortion, 3.3-V CMOS Line Driver for Ethernet and Fast Ethernet Networking Applications" by J. N. Babanezhad, which appeared in IEEE Journal of Solid-State Circuits, volume 34, 1999, pp. 1044 ff., describes a pseudo-differential line driver in which the signal is produced in the form of a current through the load. The drawback of this line driver is its high input offset, which results from the fact that transistors of different types need to be matched to one another. Furthermore, this line driver is not suitable for applications with low supply voltages.

The publication "A Differential 160 MHz Self-Terminating Adaptive CMOS Line Driver" by R. Mahadevan and D. A. Johns, which appeared in IEEE Journal of Solid State Circuits, December 2000, illustrates a line driver which is based on the shunt-series feedback principle. A drawback of this line driver is its pure voltage processing, which means that the line driver requires a voltage signal at its input.

Another line driver is described in the publication "A CMOS Transceiver for 10-Mb/s and 100-Mb/s Ethernet" by J. Everitt, J.F. Parker, P. Hurst, D. Nack and K. R. Konda, which appeared in IEEE Journal of Solid State Circuits, volume 33, 1998, pp. 2169 ff. A drawback of this line driver is its low power efficiency and also its inadequate linearity.

It is therefore an object of the invention to provide a line driver having a high linearity both in the DC voltage domain and in the radio frequency range.

SUMMARY OF THE INVENTION

An inventive line driver for amplifying an input current into an output current has a driver amplifier, a voltage-controlled output current source, a current/voltage converter and a voltage/current converter. The input current is injected into a first node. A first amplifier input on the drive amplifier is coupled to the first node and a second amplifier input on the drive amplifier essentially has a reference voltage applied to it. The current/voltage converter is connected between the first node and a second node. The function of the current/voltage converter is to convert a first current, which is supplied to the current/voltage converter from the first node, into a voltage which is present on the second node. This voltage present on the second node is converted by the voltage/current converter, which is connected to the second node, into a second current and is discharged on a current sink. The voltage-controlled output current source is controlled by the drive amplifier. A current-carrying path in the voltage-controlled output current source is connected between the second node and a third node. The output current from the inventive line driver is output from the third node.

By way of example, the current/voltage converter can be a first resistor and the voltage/current converter can be a second resistor. The second resistor is connected to the second node by means of a first connection, and its second connection has a common fixed potential, which can be a ground, in particular, applied to it.

In this patent application, a node is not necessarily to be understood to mean a branch point for a plurality of lines. Instead, a node in this case represents a point on a line whose surrounding circuitry is at approximately the same potential. This definition allows even an entire connecting line to be idealized as a node.

In addition, the coupling between the first amplifier input and the first node should not necessarily be considered to be such that the first amplifier input is connected to the first node by a connection line. It would likewise be possible for the first amplifier input and the first node to have a further component connected between them via which signals would be interchanged between the drive amplifier and the first node, so that there would likewise be coupling between the first amplifier input and the first node.

The circuit design of the inventive line driver is based on the shunt-series feedback principle, where a fundamentally new structure using pure current mode technology is used. Both the input signal and the output signal are therefore each currents. A portion of the output current is fed back to the first node as input node by the current-carrying path in the voltage-controlled output current source, which can advantageously be in the formn of a MOS transistor. The output current gain can be adjusted by virtue of the proportioning of the first and second resistors and is thus variable.

On account of the feedback with simultaneously high loop gain and the use of resistors, the inventive line driver has a high linearity in the DC voltage range. Similarly, a high linearity is obtained in the radio frequency domain on account of a very high bandwidth for the inventive line driver and effectively reduced parasites in the signal path. The use of current mode technology allows a good signal-to-noise ratio. In addition, the circuit topology of the inventive line driver is relatively easy to align with different standards. This can also be made programmable. Driving by means of a digital/analogue converter requires no additional circuits for prefiltering the signal. Instead, the prefiltering can be provided by virtue of a suitable choice of dominant pole in the feedback.

Advantageously, a first capacitor is connected between the first node and the second node. In addition, it is advantageous to connect a second capacitor between the second node and the common fixed potential. The first and second capacitors are used for radio frequency decoupling.

In line with one advantageous refinement of the invention, the drive amplifier is a transconductance amplifier. In this case, its inverting input is the first amplifier input and its noninverting input is the second amplifier input, in particular. Advantageously, the output of the drive amplifier is connected to the control connection of the voltage-controlled output current source.

A transconductance amplifier differs from a conventional operational amplifier in that it has a high-resistance output. Transconductance amplifiers are therefore particularly suitable for driving lines. This involves the assumption that the output resistance of the transconductance amplifier is high as compared with the characteristic impedance of the line.

In another advantageous refinement of the invention, transistors instead of pure resistors are used as components for the first and/or the second resistor, the transistors being operated in the resistance domain. It is also conceivable for the first and second resistors to be provided by a combination of a resistor and transistors in the resistance domain.

Advantageously, the third node can also be connected to a connection on a terminating resistor, the second connection of the terminating resistor having a further common fixed potential applied to it. The further common fixed potential can also be an externally prescribed supply voltage, for example.

In line with one particularly preferred refinement of the invention, a pseudo-differential line driver for amplifying a differential total input current into a differential total output current has a first and a second line driver with the features described above. The differential total input current is made up of a first and a second input current portion. Similarly, the differential total output current has a first and a second output current portion. The first input current portion is injected into the first node of the first line driver. The third node of the first line driver outputs the first output current portion. The procedure is similar with the second input current portion and the second output current portion, using the second line driver. In addition, the reference voltages for the first and second line drivers have the same value.

The inventive pseudo-differential line driver is particularly suitable for signal transmission of digital signals. In this case, the first input current portion and the second input current portion each have symmetrical, complementary signals. These signals are amplified by the inventive pseudo-differential line driver in a suitable manner and can feed a twisted pair line, for example. With this mode of operation, the information transmitted is determined by the polarity of the difference signals.

Like the line driver described above already, the inventive pseudo-differential line driver is distinguished by a high linearity both in the DC voltage domain and in the radio frequency range. In addition, the current mode technology results in a good signal-to-noise ratio.

In line with another particularly preferred refinement of the invention, the first node of the first line driver is additionally fed by a first controllable current source. Similarly, the first node of the second line driver is fed by a second controllable current source. In addition, the second amplifier inputs of the drive amplifiers in the first and second line drivers are advantageously coupled to a fourth node, which is fed by a third controllable current source. The current provided by the third controllable current source can be used to derive the reference voltage. By way of example, the first, the second and the third controllable current sources can be controlled by a unit for operating-point adjustment or operating-point regulation.

The measured described above can be used to adjust or regulate the operating point of the pseudo-differential line driver, so that optimum operating conditions can be guaranteed and without additional parasitic components appearing in the signal path. The operating-point adjustment or operating-point regulation allows the quiescent current drawn by the pseudo-differential line driver to be reduced without causing additional distortions of bandwidth reductions as a result. The inventive circuit of the pseudo-differential line driver is thus designed in optimum fashion for high frequencies in combination with low supply voltages.

Various refinements and developments of the pseudo-differential line driver in accordance with the present invention are possible. For example, a refinement of the pseudo-differential line driver which is shown in FIG. 2 and FIG. 3 can be provided by a pseudo-differential line driver wherein the first node of the first line driver is fed by a first controllable current source, and the first node of the second line driver is fed by a second controllable current source. The second amplifier inputs of the drive amplifiers on the first and second line drivers can be coupled to a fourth node, which is fed by a third controllable current source, and the reference voltages can be derived from the current provided by the third controllable current source. The pseudo-differential line driver may further comprise a third resistor, whose first connection is coupled to the fourth node and whose second connection has the common fixed potential, particularly the ground, applied to it. The pseudo-differential line may also comprise a third capacitor, whose first connection is coupled to the fourth node and whose second connection has the common fixed potential, particularly the ground, applied to it.

Further refinements, as for example shown in FIG. 7 and FIG. 8 and FIG. 9 and FIG. 10, can be provided by a pseudo-differential line driver wherein the first controllable current source and the second controllable current source and possibly the third controllable current source can be controlled by a unit for operating-point adjustment or operating-point regulation. The unit for operating-point adjustment or operating-point regulation can be fed by an adjustable constant current source. The first controllable current source may have a first current mirror circuit and the second controllable current source has a second current mirror circuit. The input current for the first current mirror circuit and the input current for the second current mirror circuit can be provided by the adjustable constant current source. The third controllable current source may have a third current mirror circuit, whose input current is provided by the adjustable constant current source, in particular. The first, second and third current mirror circuits may have a common input transistor and, in particular, may be designed from p-channel MOS transistors. The first controllable current source may have a first current mirror circuit, whose input current is provided by a first adjustable constant current source and a first regulating current source, and the second controllable current source may have a second current mirror circuit, whose input current is provided by a second adjustable constant current source and a second regulating current source. The first regulating current source may have a first operational amplifier, which is a transconductance amplifier, in particular, with the input current for the first current mirror circuit being able to be controlled by the first operational amplifier such that the second node of the first line driver is at a further reference voltage, and the second regulating current source may have a second operational amplifier, which is a transconductance amplifier, in particular, with the input current for the second current mirror circuit being able to be controlled by the second operational amplifier such that the second node of the second line driver is at the further reference voltage. The inverting input of the first operational amplifier can be coupled to the second node of the first line driver, the inverting input of the second operational amplifier can be coupled to the second node of the second line driver, the noninverting inputs of the first and second operational amplifiers may have the further reference voltage applied to them, the output of the first operational amplifier can be coupled to the input of the first current mirror circuit, and the output of the second operational amplifier can be coupled to the input of the second current mirror circuit. An operational amplifier can be connected up such that it regulates the voltage present on the fourth node to a further reference voltage. The output of the operational amplifier can be connected to the input of the common input transistor. The inverting input of the operational amplifier can be coupled to the fourth node, and the noninverting input of the operational amplifier may have the further reference voltage applied to it. The first line driver may have a first controllable current source, a first further MOS transistor, a third resistor and a fourth node, wherein the first controllable current source feeds the fourth node, the gate connection and a first connection on the drain/source path in the first further MOS transistor are coupled to the fourth node, the output of the drive amplifier in the first line driver is coupled to the fourth node, and a first connection on the third resistor is coupled to a second connection on the drain/source path in the first further MOS transistor, and a second connection on the third resistor has the common fixed potential, particularly the ground, applied to it, and the second line driver has a second controllable current source, a second further MOS transistor, a fourth resistor and a fifth node, where the second controllable current source feeds the fifth node, the gate connection and a first connection on the drain/source path in the second further MOS transistor are coupled to the fifth node, the output of the drive amplifier in the second line driver is coupled to the fifth node, and a first connection on the fourth resistor is coupled to a second connection on the drain/source path in the second further MOS transistor, and a second connection on the fourth resistor has the common fixed potential, particularly the ground, applied to it. The first controllable current source may have a first current mirror circuit and the second controllable current source has a second current mirror circuit. The input current for the first current mirror circuit and the input current for the second current mirror circuit can be provided by an adjustable constant current source. The first and second current mirror circuits may have a common input transistor and, in particular, are designed from p-channel MOS transistors. The first further MOS transistor and the second further MOS transistor can be n-channel MOS transistors. A third capacitor can be connected between the first node of the first line driver and the first amplifier input of the drive amplifier in the first line driver, and a fourth capacitor can be connected between the first node of the second line driver and the first amplifier input of the drive amplifier in the second line driver. A fifth resistor can be connected between the first and second amplifier inputs of the drive amplifier in the first line driver, and a sixth resistor can be connected between the first and second amplifier inputs of the drive amplifier in the second line driver. A first low-pass filter can be connected between the fourth node and the output of the drive amplifier in the first line driver, and a second low-pass filter can be connected between the fifth node and the output of the drive amplifier in the second line driver. The first low-pass filter may have a seventh resistor and a fifth capacitor, where the seventh resistor is connected between the fourth node and the output of the drive amplifier in the first line driver, and a first connection on the fifth capacitor may be coupled to the fourth node and a second connection on the fifth capacitor may have the common fixed potential, particularly the ground, applied to it, and the second low-pass filter may have an eighth resistor and a sixth capacitor, wherein the eighth resistor is connected between the fifth node and the output of the drive amplifier in a second line driver, and a first connection on the sixth capacitor is coupled to the fifth node and a second connection on the sixth capacitor has the common fixed potential, particularly the ground, applied to it. The pseudo-differential line driver can be produced using CMOS processes.

BRIEF DESCRIPTION OF THE DRAWINGS

The invention is explained in more detail below by way of example with reference to the drawings, in which.

DETAILED DESCRIPTION OF THE PREFERRED EMBODIMENTS

Figure 1:
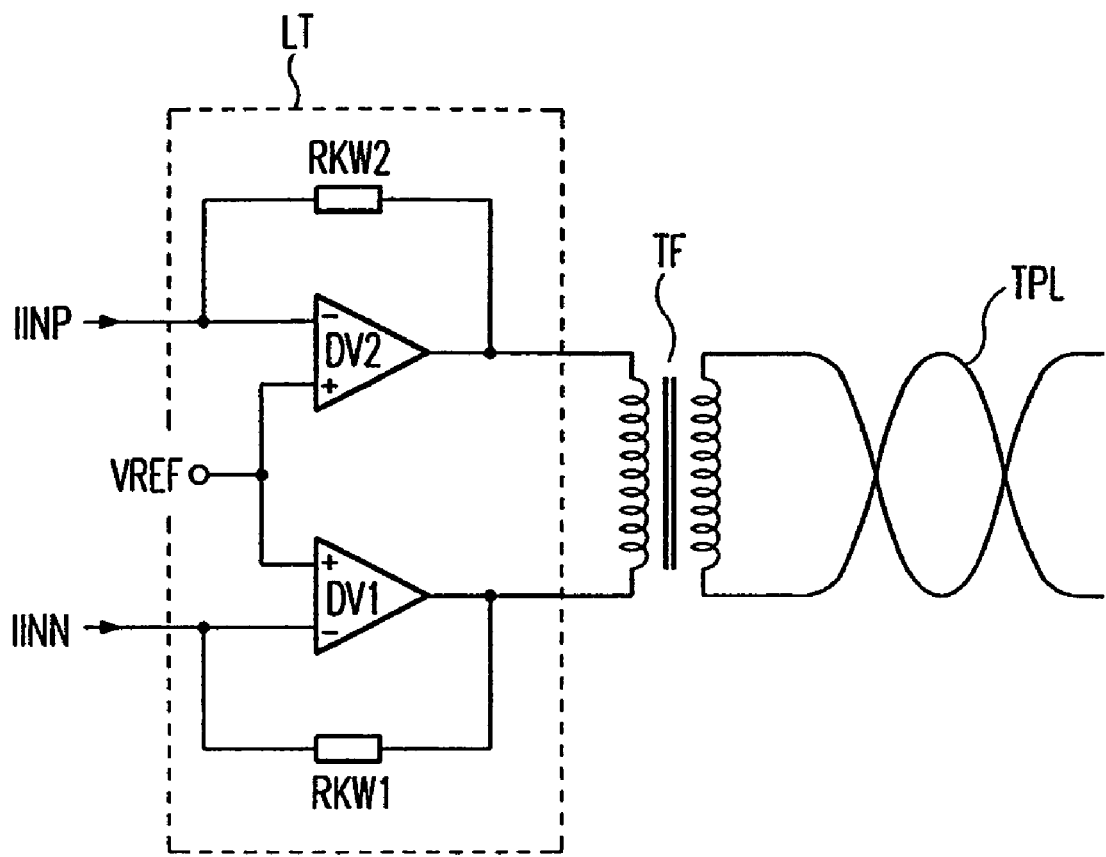
FIG. 1 shows a schematic diagram of a pseudo-differential line driver based on the prior art which feeds a twisted pair line.
Figure 2:
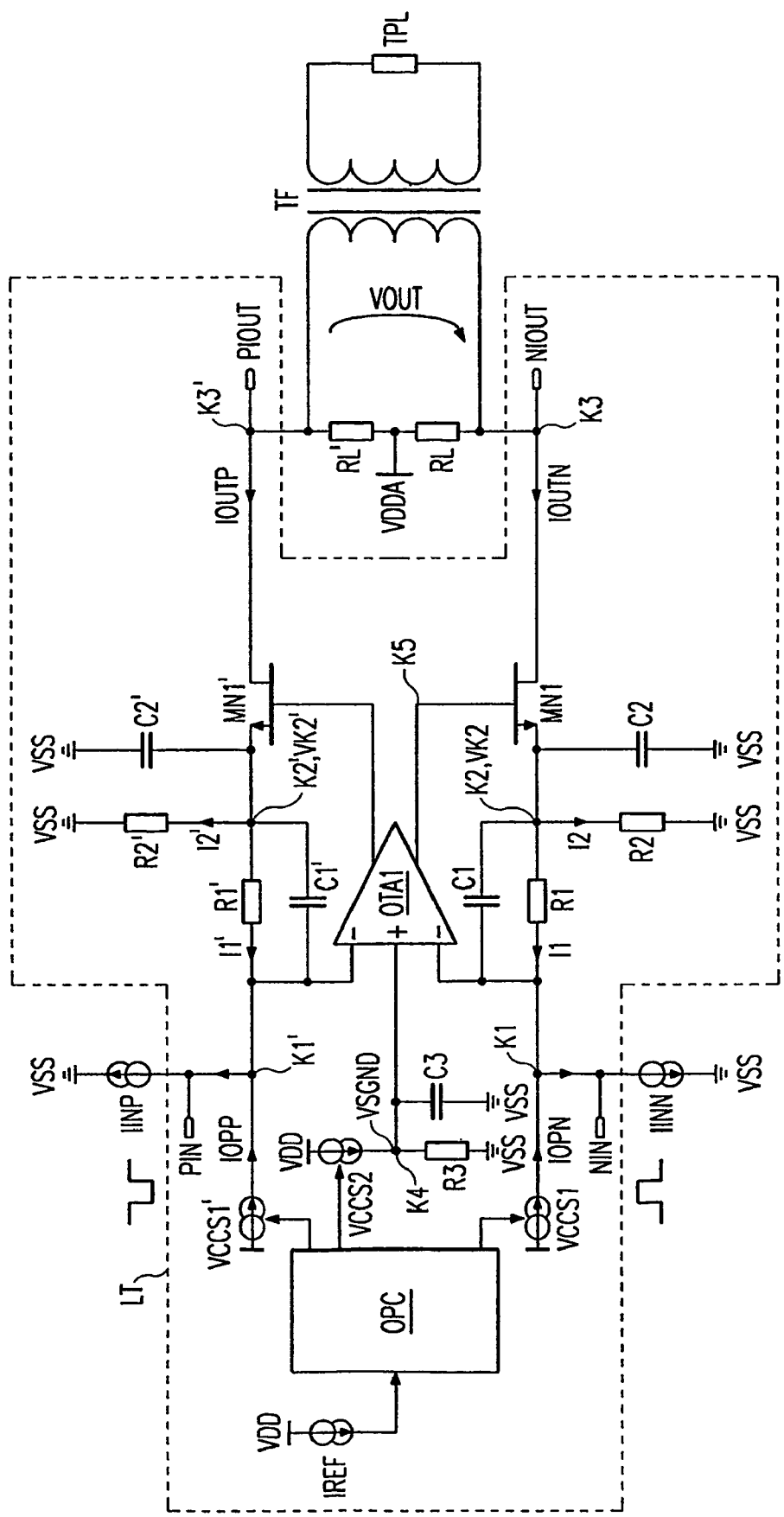
FIG. 2 shows a circuit diagram of a first exemplary embodiment of the inventive pseudo-differential line driver.

FIG. 2 shows a circuit diagram of a first exemplary embodiment of an inventive pseudo-differential line driver LT produced using CMOS technology. The circuit diagram of the pseudo-differential line driver LT is arranged symmetrically around a line which is imagined to run horizontally through the center of the circuit diagram. For reasons of simplicity and clarity, the subsequent description of the circuit diagram discusses only the bottom half of the circuit diagram in some cases. Since the symmetry of the circuit diagram is obvious, the way in which the top half of the circuit diagram is connected up and works is obtained in a similar manner. In addition, the designations MNx and MPx (where x=1, 2, 3, . . . ) represent n-channel MOSFETs and p-channel MOSFETs, respectively, below.

The pseudo-differential line driver LT is in the form of a controllable current source. Complementary input currents IINN and IINP, which feed the pseudo-differential line driver LT at inputs NIN and PIN, are output in amplified form as output currents IOUTN and INOUTP at outputs NIOUT and PIOUT.

The output current IOUTN or IOUTP is produced by a transistor MN1 or MN1' and is output on the latter's drain connection. To this end, the transistor MN1 or MN1' is driven by a transconductance amplifier OTA1. In this regard, the output of the transconductance amplifier OTA1 and the gate connection of the transistor MN1 or MN1' are connected to one another. A portion of the output current IOUTN or IOUTP is fed back to an inverting input on the transconductance amplifier OTA1 by the drain/source path in the transistor MN1 or MN1'. In this regard, the transistor MN1 or MN1' uses its source connection to feed a node K2 or K2' which is in turn connected to a node K1 or K1' via a resistor R1 or R1'. It will be pointed out at this juncture that a fundamental advantage of this arrangement is the low node resistance on the node K2 or K2'. The node K1 or K1' is connected both to the inverting input of the transconductance amplifier OTA1 and to the input NIN or PIN of the pseudo-differential line driver LT. The node K2 or K2' also has a resistor R2 or R2' connected to it which is connected to a common fixed potential, which can be a ground VSS, in particular.

The noninverting input of the transconductance amplifier OTA1 is connected to a node K4. On the node K4, a voltage VSGND is produced which is used as signal ground. The voltage VSGND is produced in this manner by a voltage-controlled current source VCCS2 which feeds the node K4. The current produced by the voltage-controlled current source VCCS2 drains to the ground VSS via a resistor R3 coupled to the node K4.

Connected between the nodes K1 and K2 or K1' and K2' is a capacitor C1 or C1'. On the nodes K2 and K2', a capacitor C2 or C2' is connected to the ground VSS. A similar situation applies to the node K4 and a capacitor C3. The capacitors C1, C1', C2, C2' and C3 are used for radio frequency decoupling.

The task of the transconductance amplifier OTA1 is to regulate the voltage present on the node K1 or K1' to the voltage VSGND present on the node K4. To this end, the gate potential of the transistor MN1 or MN1' is varied as appropriate. The resistors R1 and R2 or R1' and R2' which form the feedback network can be used to adjust the gain of the pseudo-differential line driver LT.

In FIG. 2, the output side of the pseudo-differential line driver LT is connected up to a transformer TF, with an output voltage VOUT produced by the output currents IOUTN and IOUTP being applied to the primary side of the transformer TF. The transformer TF feeds a twisted pair line TPL, for example. The output currents IOUTN and IOUTP are discharged to an external supply voltage VDDA via terminating resistors RL and RL' which are connected between the nodes K3 and K3'. The output voltage VOUT drops across the two series-connected terminating resistors RL and RL'. In this case, the output resistance of the pseudo-differential line driver LT is much higher than the external load comprising the terminating resistors RL and RL'.

To adjust and possibly regulate the DC operating point, further voltage-controlled current sources VCCS1 and VCCS1' are used besides the voltage-controlled current source VCCS2. The voltage-controlled current source VCCS1 or VCCS1' feeds the node K1 or K1' with a current IOPN or IOPP. The voltage-controlled current sources VCCS1, VCCS1' and VCCS2 are controlled by a unit OPC for DC operating-point adjustment or DC operating-point regulation. The unit OPC in turn is fed by a current which is provided by a constant current source IREF. The current from the constant current source IREF is used to adjust the DC operating point for the pseudo-differential line driver LT and is simultaneously also used as a reference current for the signal production. This ensures synchronism between the current signals and the operating points of the circuit, and overdrive effects are avoided. In addition, a weighted replica of the current provided by the constant current source IREF is used to adjust the DC for the transistor MN1 or MN1' and hence also to adjust the quiescent current through the external load.

In addition, the present circuit makes it possible to carry out shunt-current or quiescent-current compensation. This involves being able to regulate the presaturation of the transformer TF connected downstream of the pseudo-differential line driver LT, the power drawn by the circuit in the quiescent case and any asymmetries in the circuit.

Figure 3:
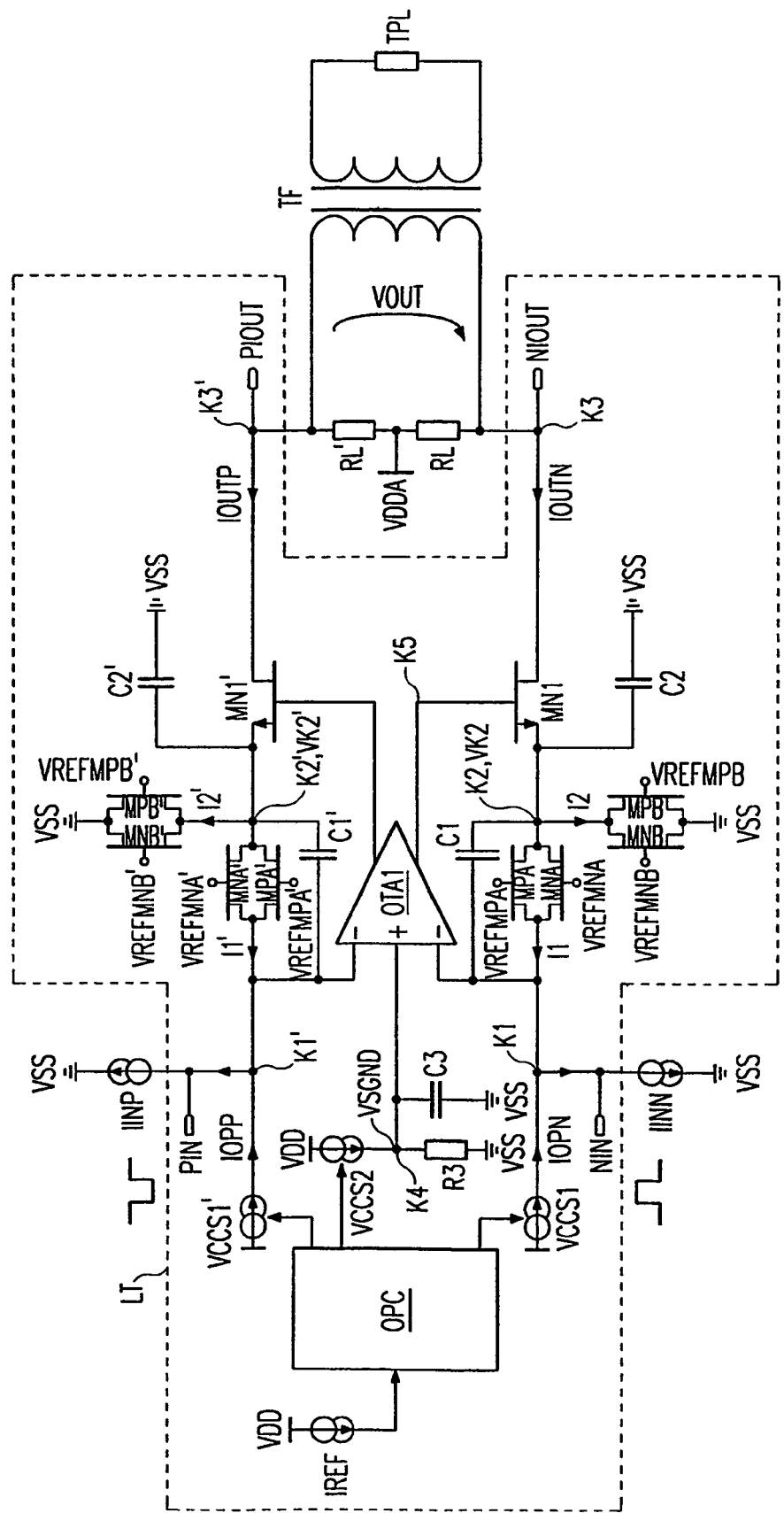
FIG. 3 shows a circuit diagram of a variation of the first exemplary embodiment of the inventive pseudo-differential line driver.

FIG. 3 shows a circuit diagram of a variation of the first exemplary embodiment shown in FIG. 2. In this line driver LT, the resistors R1 and R1' and also R2 and R2' have been replaced by transistors MNA and MPA or MNA' and MPA' and also MNB and MPB or MNB' and MPB'. In this case, the transistors MNA, MNA', MNB and MNB' are n-channel MOSFETs, while the transistors MPA, MPA', MPB and MPB' are p-channel MOSFETs.

The drain/source path of the transistor MNA is connected between the nodes K1 and K2. Connected in parallel with the transistor MNA is the transistor MPA. The drain/source path of the transistor MNB is connected between the node K2 and the ground VSS. Connected in parallel with the transistor MNB is the transistor MPB. A similar situation applies to the transistors NIA' and MPA' and also MNB' and MPB'.

The gate potentials of the transistors MNA, MPA, MNB etc. are controlled by reference voltages VREFx (where x=MNA, MPA, MNB etc.). Provided that the transistors MNA, MPA, MNB, MPB, MNA', MPA', MNB' and MPB' are operated in the resistance domain, these transistors can adjust the gain factor of the pseudo-differential line driver LT in the present circuit arrangement. Provision can also be made for the transistors MNA, MPA, MNB, MPB, MNA', MPA', MNB' and MPB' all to have the same gate voltage applied to them. To this end, the gate connections of these transistors could be connected to one another in the circuit and could be supplied by a common reference voltage source.

The text below describes the DC response of the pseudo-differential line driver LT shown in FIG. 2.

In the quiescent state, i.e. without an input current IINN feeding the input NIN, a current 12 flowing through the resistor R2 becomes established on the basis of the voltage present on the node K2. The voltage present on the node K2 is determined by the voltage VSGND which is present on the node K4 and by the voltage drop across the resistor R1, which is caused by the current IOPN. The circuit's control response produces the voltage VSGND on the node K1, provided that both the current IOPN and the current I1 flowing through the resistor R1 are equal to zero. In the quiescent state, the following thus applies for the output current IOUTN through the drain/source path in the transistor MN1 and through the terminating resistor RL:

$$IOUTN = VSGND/R2 \quad (1)$$

Equation (1) can be used to calculate the output voltage VOUT dropping between the nodes K3 and K3':

$$VOUT = VDDA - IOUTN \cdot RL \quad (2)$$

From equation (1) it is possible to read that without the current IOPN provided by the voltage-controlled current source VCCS1 the output current IOUTN in the quiescent state through the load would result from the quotient of the voltage VSGND, which is the signal ground, and the resistance R2. Without any DC operating-point regulation, the output current IOUTN would therefore be directly proportional to the signal ground in the quiescent state. For driving the pseudo-differential line driver LT, however, it is advantageous for the signal ground to be left constant. The addition of quiescent-current regulation to the circuit allows the output current IOUTN to be regulated in the quiescent state without having to alter the signal ground in the process. Another advantage of quiescent-current regulation is that it allows the voltage VSGND to be higher than the voltage present on the node K2. This expands the effectively useable voltage modulation range over the load. However, a minimum voltage drop across the load needs to be guaranteed in the quiescent state in order for the adjusted operating point, and hence the operation of the pseudo-differential line driver LT as a current source, to be ensured when the pseudo-differential line driver LT is implemented using transistors, as shown in FIG. 2.

When considering the current IOPN, the result from the circuit arrangement is that the current I1 is converted into a voltage VK2 by the resistor R1 in the direction of the node K2. This voltage VK2 on the node K2 is converted into a current I2 again by the resistor R2. All in all, this results in the following equation for the output current IOUTN:

$$IOUTN = \frac{VSGND \pm IOPN \cdot R1}{R2} \quad (3)$$

For the output voltage VOUT, the result is accordingly:

$$VOUT = VDDA - \frac{VSGND \pm IOPN \cdot R1}{R2} \cdot RL \quad (4)$$

When using a CMOS differential input stage instead of a conventional current operational amplifier, the input resistance is very high, which in turn entails a small fault current. The result of this is a fundamental contribution to the high linearity of the inventive pseudo-differential line driver LT in connection with the variance in the input resistance over modulation and frequency.

The DC gain Aidc for the circuit shown in FIG. 2 results from the following equation:

$$A_{idc} = \frac{IOUTN}{IINN} = \left(\frac{R1 + R2}{R2}\right) \quad (5)$$

The following applies for the output resistance $r_{outMN1}$ of the circuit shown in FIG. 2:

$$r_{outMN1} \cong \frac{1}{gds_{MN1}} \cdot [1 + gm_{totMN1} \cdot (R1\|R2)] + (R1\|R2), \quad (6)$$

where $gds_{MN1}$ indicates the drain/source gradient of the transistor MN1 and $gm_{totMN1}$ indicates the transfer admittance of the transistor MN1 taking into account the push-pull effect. For $gds_{MN1}$ and $gm_{totMN1}$, the following equations apply:

$$gds_{MN1} \cong \frac{\lambda}{1 + \lambda \cdot V_{dsMN1}} \quad (7)$$

$$gm_{totMN1} \cong \sqrt{\frac{\mu_n \cdot C_{ox} \cdot W_{MN1}}{L_{MN1}} I_{dsMN1}} \cdot \left(1 - \frac{\gamma/2}{\sqrt{2 \cdot \phi_P + V_{sbMN1}}}\right) \quad (8)$$

In the above equations, $\lambda$ is a process constant, $V_{dsMN1}$ is the drain/source voltage of the transistor MN1, $\mu_n$ is the mobility of the charge carriers, $C_{ox}$ is the capacitance of the gate oxide, $W_{MN1}$ and $L_{MN1}$ are the width and length of the gate electrode of the transistor MN1, $I_{dsMN1}$ is the current flowing through the drain/source path in the transistor MN1, $\gamma$ is a constant, $\Phi_p$ is a potential and $V_{sbMN1}$ is the source/bulk voltage of the transistor MN1.

The equations (3), (6), (7) and (8) can be used to derive the dependency of the output resistance $r_{outMN1}$ on the current IOPN and on the voltage VSGND present on the node K4.

Figure 4:
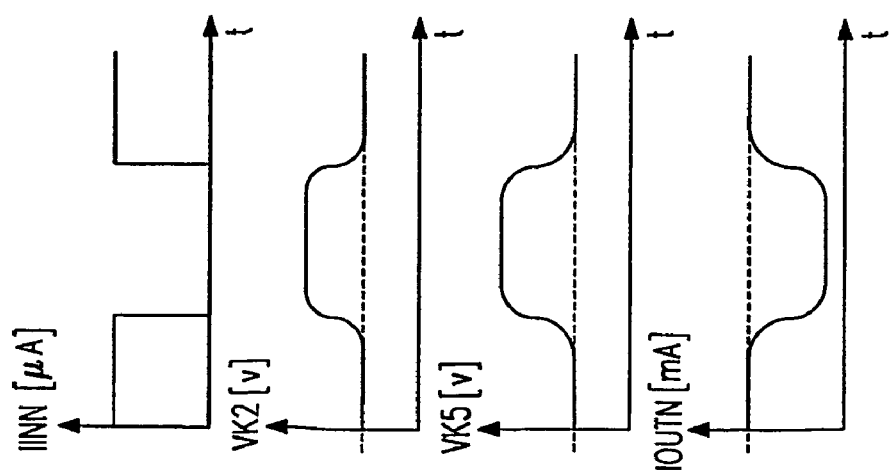
FIG. 4 shows voltage and current profiles to clarify the way in which the inventive line driver works.

A better understanding of the function of the inventive pseudo-differential line driver LT is given by the signal profiles, shown in FIG. 4, for the input current IINN, for the voltage VK2 present on the node K2, for the voltage VK5 present on a node K5, the node K5 being on the connecting line between the output of the transconductance amplifier OTA1 and the gate connection of the transistor MN1, and for the output current IOUTN. The signals shown in FIG. 4 have been plotted against time t.

The text below is intended to consider the AC response of the pseudo-differential line driver LT shown in FIG. 2.

Figure 5:
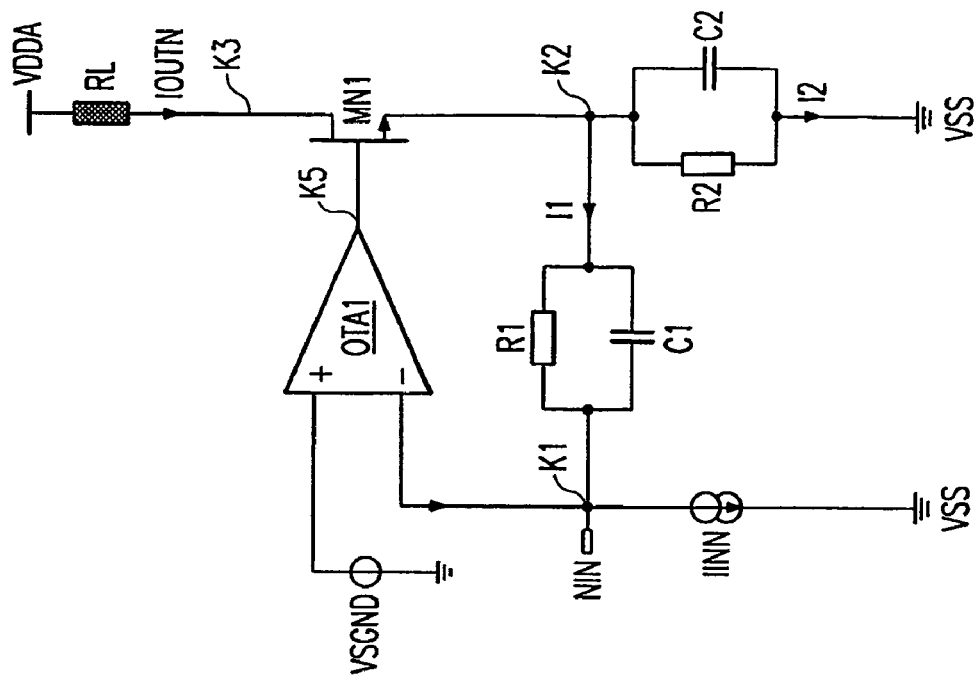
FIG. 5 shows a circuit diagram of an exemplary embodiment of the inventive line driver to clarify its AC characteristics.
Figure 6:
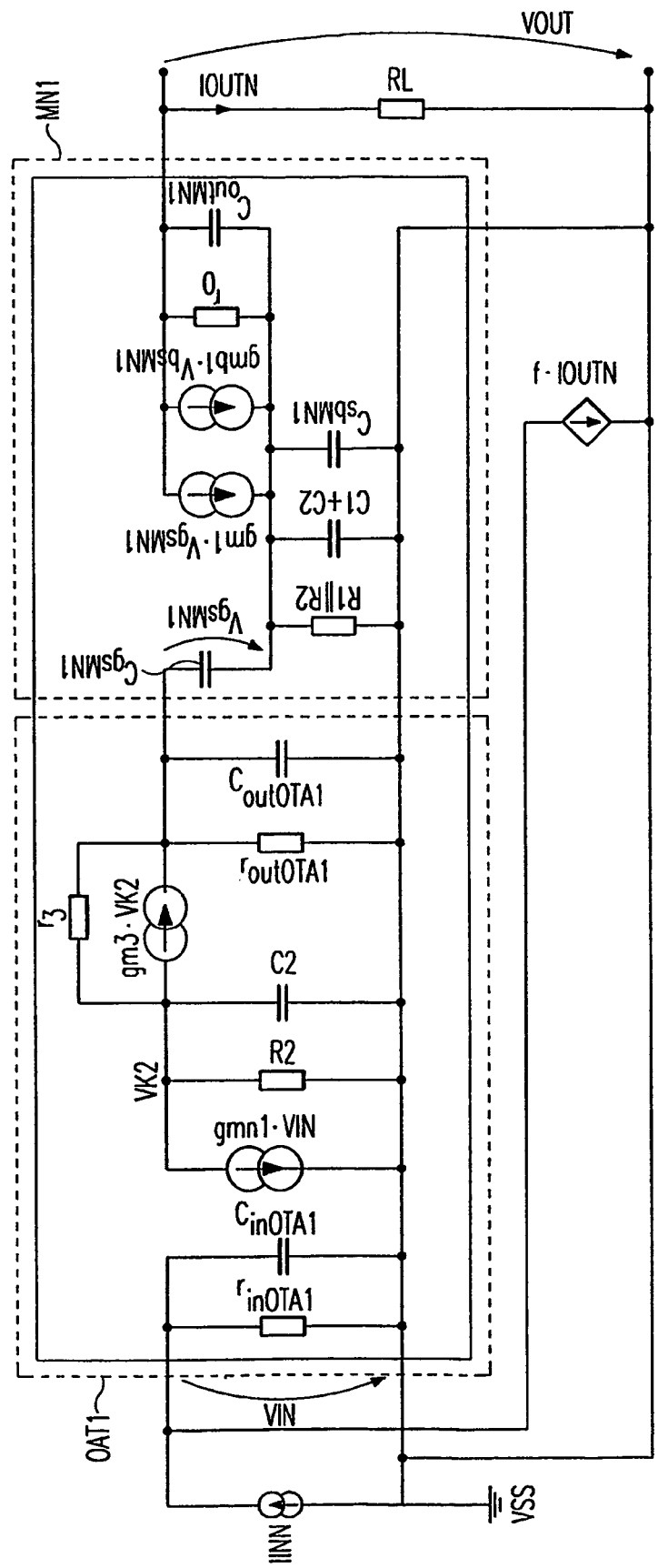
FIG. 6 shows a small-signal equivalent circuit diagram of the exemplary embodiment of the inventive line driver which is shown in FIG. 5.

In this regard, it serves the purpose of better illustration to extract from the circuit shown in FIG. 2 the part of the circuit which is required for amplifying one of the two complementary input currents IINN and IINP. FIG. 5 shows the part of the circuit of the pseudo-differential line driver LT which is used for amplifying the input current IINN. The small-signal equivalent circuit diagram for the circuit shown in FIG. 5 is shown in FIG. 6. In the case of the small-signal equivalent circuit diagram, it is assumed that the transconductance amplifier OTA1 is in a "folded cascode configuration".

FIG. 6 marks the areas of the circuit which portray the small-signal equivalent circuit diagram for the transconductance amplifier OTA1 or for the transistor MN1 in dashed lines. VIN denotes the input voltage for the line driver and f denotes the feedback factor for the feedback loop. In the case of the transconductance amplifier OTA1, $r_{inOTA1}$, $C_{inOTA1}$, $r_{outOTA1}$ and $C_{outOTA1}$ are its input resistance, its input capacitance, its output resistance and its output capacitance. In the case of the transistor MN1, $C_{gsMN1}$ is its gate/source capacitance, $V_{gsMN1}$ is its gate/source voltage, $C_{sbMN1}$ is its source/bulk capacitance, $V_{bsMN1}$ is its bulk-source voltage and $C_{outMN1}$ is its output capacitance. The variables gmn1, gm3, gm1 and gmb1 denote transfer admittances, and $r_3$ and $r_0$ are resistances.

The small-signal equivalent circuit diagram can be used to derive the mathematical relations for the input impedance $Z_{in}(s)$, the output impedance $Z_{out}(s)$ and the transfer function $A_i(s)$ of the line driver shown there in the frequency domain.

The input impedance $Z_{in}(s)$ of the line driver is obtained from the following equations:

$$Z_{in}(s) \approx \left(\frac{Z_{inOTA1}(s)\|(R1+R2)}{1 + T_{loop}(s)}\right) \quad (9)$$

$$a(s) = A_{OTA1}(s) \cdot A_{MN1}(s) \quad (10)$$

$$f(s) = \left(\frac{R2}{R1+R2}\right) \cdot \frac{1 + s \cdot R1 \cdot C1}{1 + s \cdot \frac{R1 \cdot R2}{R1+R2} \cdot C1} \quad (11)$$

$$T_{loop}(s) = a(s) \cdot f(s) \quad (12)$$

In equations (9) to (12), $Z_{inOTA1}(s)$ is the input impedance of the transconductance amplifier OTA1, $T_{loop}(s)$ is the loop gain, a(s) is the open-circuit gain factor of the amplifier arrangement, $A_{OTA1}(s)$ is the open-circuit gain factor of the transconductance amplifier OTA1, $A_{MN1}(s)$ is the open-circuit gain factor of the transistor MN1 and f(s) is the feedback factor.

Assuming that the transconductance amplifier OTA1 is a single-stage amplifier, the open-circuit gain factor $A_{OTA1}(s)$ of the transconductance amplifier OTA1 can be specified in simplified form as a function with a zero $\omega_{z1}$ and pole points $\omega_{p1}$ and $\omega_{p2}$:

$$A_{OTA1}(s) = \frac{A_{V0dc} \cdot (1 - s/\omega_{z1})}{(1 - s/\omega_{p1}) \cdot (1 - s/\omega_{p2})}, \quad (13)$$

where $A_{V0dc}$ is the open-circuit gain factor of the transconductance amplifier OTA1 in the DC case.

The above equations result in the following as the transfer function $A_i(s)$ of the line driver:

$$A_i(s) = \frac{R1 \cdot R2}{R2} \cdot \frac{1}{1 + 1/T_{loop}(s)} \quad (14)$$

Taking into account equation (6) results in the output impedance $Z_{out}(s)$ as follows:

$$z_0(s) = r_{outMN1}(s) \cdot (1 + T_{loop}(s)) \quad (15)$$

$$z_{out}(s) = \frac{RL\|z_0(s)}{1 + s/((RL\|z_0(s)) \cdot C_{dsMN1})}, \quad (16)$$

where $C_{dsMN1}$ is the drain/source capacitance of the transistor MN1.

Since the input impedance of the operational amplifier stage in CMOS technology is in the region above 100 kΩ, the amplifier circuit has only a small influence on the input impedance $Z_{in}(s)$ of the line driver. There is thus no additional loading on the controllable current source. Unwanted distortions as a result of an increased fault current in the frequency domain, possibly caused by charge reversal effects and a low input impedance for current amplifier configurations, are minimized as a result. This is a fundamental advantage of the present circuit. The input impedance $Z_{in}(s)$ of the line driver can therefore be represented as follows, taking into account equation (2):

$$Z_{in}(s) \cong \frac{R1 + R2}{1 + T_{loop}(s)} \quad (17)$$

Assuming that the unit OPC represents a feedback control loop for the operating point and therefore regulates the quiescent current through the transistor MN1, the transfer function $A_i(s)$ from equation (14) needs to be aligned to suit the circuit arrangement shown in FIG. 2. To simplify, the feedback loop can be regarded as a system having a dominant pole $\omega_{fb}$, and the following equation applies for the transfer function $H_{fb}(s)$ at the Laplace level, where $A_{0fb}$ is the DC gain:

$$H_{fb}(s) = \frac{A_{0fb}}{1 - s/\omega_{fb}} \quad (18)$$

Assuming a feedback control loop for the operating point, the following function is thus obtained for the transfer function $A_{ifb}(s)$:

$$A_{ifb}(s) = \frac{A_i(s)}{1 + A_i(s) \cdot H_{fb}(s)} \quad (19)$$

$$= \frac{\frac{R1 \cdot R2}{R2} \cdot \frac{1}{1 + 1/T_{loop}(s)}}{1 + \frac{R1 \cdot R2}{R2} \cdot \frac{A_{0fb}}{(1 + 1/T_{loop}(s)) \cdot (1 - s/\omega_{fb})}}$$

The pole point $\omega_{fb}$ of the feedback loop acts as an additional zero in the transfer function $A_{ifb}(s)$. The pole point $\omega_{fb}$ needs to be chosen such that the lowest spectral frequency components of the current signal which is to be amplified are transmitted without any additional distortions, and the stability of the line driver is not impaired.

When implementing the line driver with an AC coupling, as presented below in FIG. 10, equation (9) needs to be provided with an additional zero. A small-signal analysis then results in the following transfer function $A_{iac}(S)$ in the frequency domain:

$$A_{iac}(s) = \frac{R1 + R2}{R2} \cdot \sqrt{\left(\frac{1}{1 + \frac{1}{T_{loop}(s)}}\right) \cdot \left(1 - \frac{1}{1 - s \cdot CC1 \cdot RC1}\right)} \quad (20)$$

A few fundamental considerations relating to the stability of the pseudo-differential line driver LT shown in FIG. 2 are employed below. As a criterion for the stability of the circuit, it is possible to use the loop gain $T_{-loop}(s)$:

$$T_{loop}(s) = \frac{A_{VOdc} \cdot A_{VOMN1}}{A_{idc}} \cdot \quad (21)$$

$$\frac{(1 - s/\omega_{z1}) \cdot (1 - s/\omega_{z2})}{(1 - s/\omega_{p1}) \cdot (1 - s/\omega_{p2}) \cdot (1 - s/\omega_{p3}) \cdot (1 - s/\omega_{p4})}$$

In this context, $\omega_{z2}$ is a zero and $\omega_{p3}$ is a pole point in the feedback network, $A_{VOMN1}$ is the open-circuit gain factor of the transistor MN1, $\omega_{p4}$ is a zero for the transistor MN1 and $A_{idc}$ is a DC gain. For the DC gain $A_{idc}$ and the open-loop gain factor $A_{VOMN1}$ of the transistor MN1, equations (22) and (23) apply:

$$A_{idc} = \frac{R1 + R2}{R2} \quad (22)$$

$$A_{VOMN1} \cong \frac{gm_{MN1}}{gm_{MN1} + 1} \quad (23)$$

In equation (23), $gm_{MN1}$ is the transfer admittance of the transistor MN1.

The zeros $\omega_{z1}$ and $\omega_{z2}$ and also the pole points $\omega_{p1}, \omega_{p2}, \omega_{p3}$ and $\omega_{p4}$ result approximately from equations (24) to (29):

$$\omega_{z1} \cong \frac{gm_{OTA1}}{C_{outOTA1}} \quad (24)$$

$$\omega_{z2} \cong \frac{1}{R1 \cdot C1} \quad (25)$$

$$\omega_{p1} \cong \frac{1}{r_{outOTA1} \cdot C_{outOTA1}} \quad (26)$$

$$\omega_{p2} \cong \frac{1}{r_3 \cdot C2} \quad (27)$$

$$\omega_{p3} \cong \frac{R1 + R2}{R2} \cdot \frac{1}{R1 \cdot C1} \quad (28)$$

$$\omega_{p4} \cong \frac{1}{r_{outMN1} \cdot \left(1 + \frac{A_{VOdc} \cdot A_{VOMN1}}{A_{idc}}\right) \cdot C_{outMN1}} \quad (29)$$

In equation (24), $gm_{OTA1}$ denotes the transfer admittance of the transconductance amplifier OTA1.

The above equations result in the following as phase reserve PM:

$$PM = \pi/2 - \arctan\left(\frac{GBW}{2\pi \cdot \omega_{p1}}\right) - \arctan\left(\frac{GBW}{2\pi \cdot \omega_{p2}}\right) - \quad (30)$$

$$\arctan\left(\frac{GBW}{2\pi \cdot \omega_{p3}}\right) - \arctan\left(\frac{GBW}{2\pi \cdot \omega_{p4}}\right) +$$

$$\arctan\left(\frac{GBW}{2\pi \cdot \omega_{z1}}\right) + \arctan\left(\frac{GBW}{2\pi \cdot \omega_{z2}}\right)$$

In this context, the gain bandwidth product GBW of the pseudo-differential line driver LT can be calculated according to the following equation:

$$GBW \cong \frac{A_{VOdc} \cdot A_{VOMN1}}{A_{idc}} \cdot \frac{1}{2\pi \cdot R1 \cdot C1} \quad (31)$$

The dominant pole $\omega_d$ of the circuit arrangement is determined by the feedback path:

$$\omega_d = \frac{1}{R1 \cdot C1} \quad (32)$$

If the pole $\omega_{p2}$ of the transconductance amplifier OTA1 and the parasitic pole $\omega_{p4}$ at the output of the transistor MN1 are greater than the dominant pole $\omega_d$, the stability of the pseudo-differential line driver LT is determined by the pole $\omega_d$ in the feedback path. It is therefore possible to dispense with additional stabilization of the transconductance amplifier OTA1. In addition, the dominant pole $\omega_d$ can be designed such that the pseudo-differential line driver LT is also used as a shape filter.

Should the power drawn mean that the pole $\omega_{p2}$ is too close to the dominant pole $\omega_d$, then an additional zero can be produced by an AC feed forward circuit from the input of the transconductance amplifier OTA1 to the cascode. The pole point $\omega_{p2}$ is shifted to higher frequencies as a result of this pole-point compensation.

Figure 8:
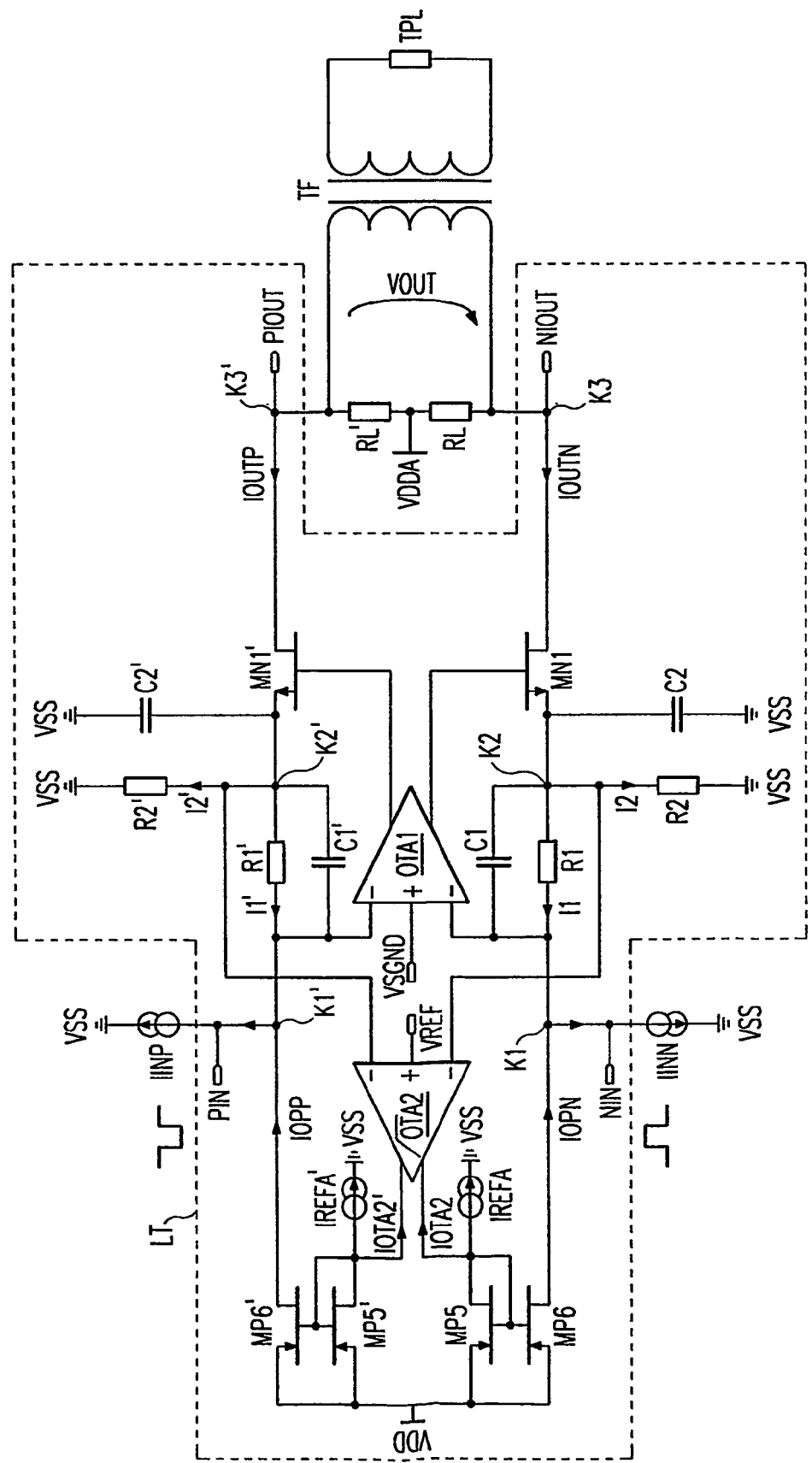
FIG. 8 shows a circuit diagram of a third exemplary embodiment of the inventive pseudo-differential line driver.
Figure 10:
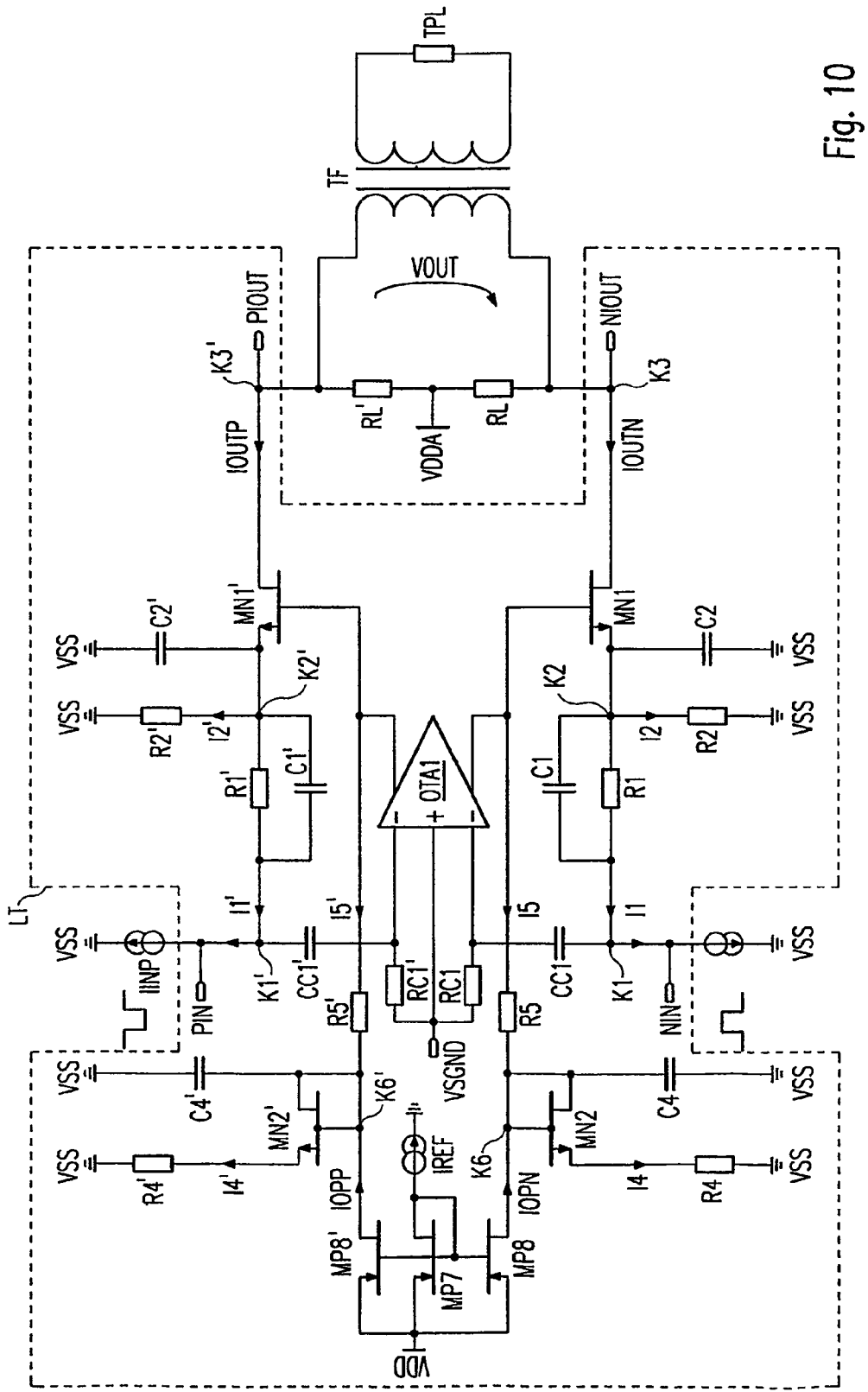
FIG. 10 shows a circuit diagram of a fifth exemplary embodiment of the inventive pseudo-differential line driver.

To produce the circuits which are described below and are shown in FIGS. 8 and 10, the consideration of stability needs to take account of the additional zero as a result of the feedback path or as a result of the AC coupling. As a clue it can be assumed that the cutoff frequencies of the zeros should be a long way below the dominant pole $\omega_d$.

In the case of most applications of the pseudo-differential line driver LT, such as in Ethernet 10/100/1000 Base T, the output pulse needs to keep to a pulse mask. Assuming that the dominant pole point $\omega_d$ is smaller than the pole points $\omega_{p1}$ to $\omega_{p4}$, the response of the pseudo-differential line driver LT in the time domain can be indicated in simplified form as follows:

$$VOUT(t) = RL \cdot IINN \cdot (1 - \exp(-t/\omega_d)) \quad (33)$$

For the pulse mask in the 1000 Base T standard, a rise of between 10% and 90% of the pulse level is demanded for a pulse of 1 V within a rise time of 4 ns. From such demands in the respective underlying standard and from the equations indicated above, it is possible to proportion the pseudo-differential line driver LT accordingly.

Further exemplary embodiments of the inventive pseudo-differential line driver LT are presented below. In particular, the intention here is to demonstrate implementation options for the unit OPC for DC operating-point adjustment or DC operating-point regulation (shown in FIG. 2) and the voltage-controlled current sources VCCS1, VCCS1' and VCCS2.

Figure 7:
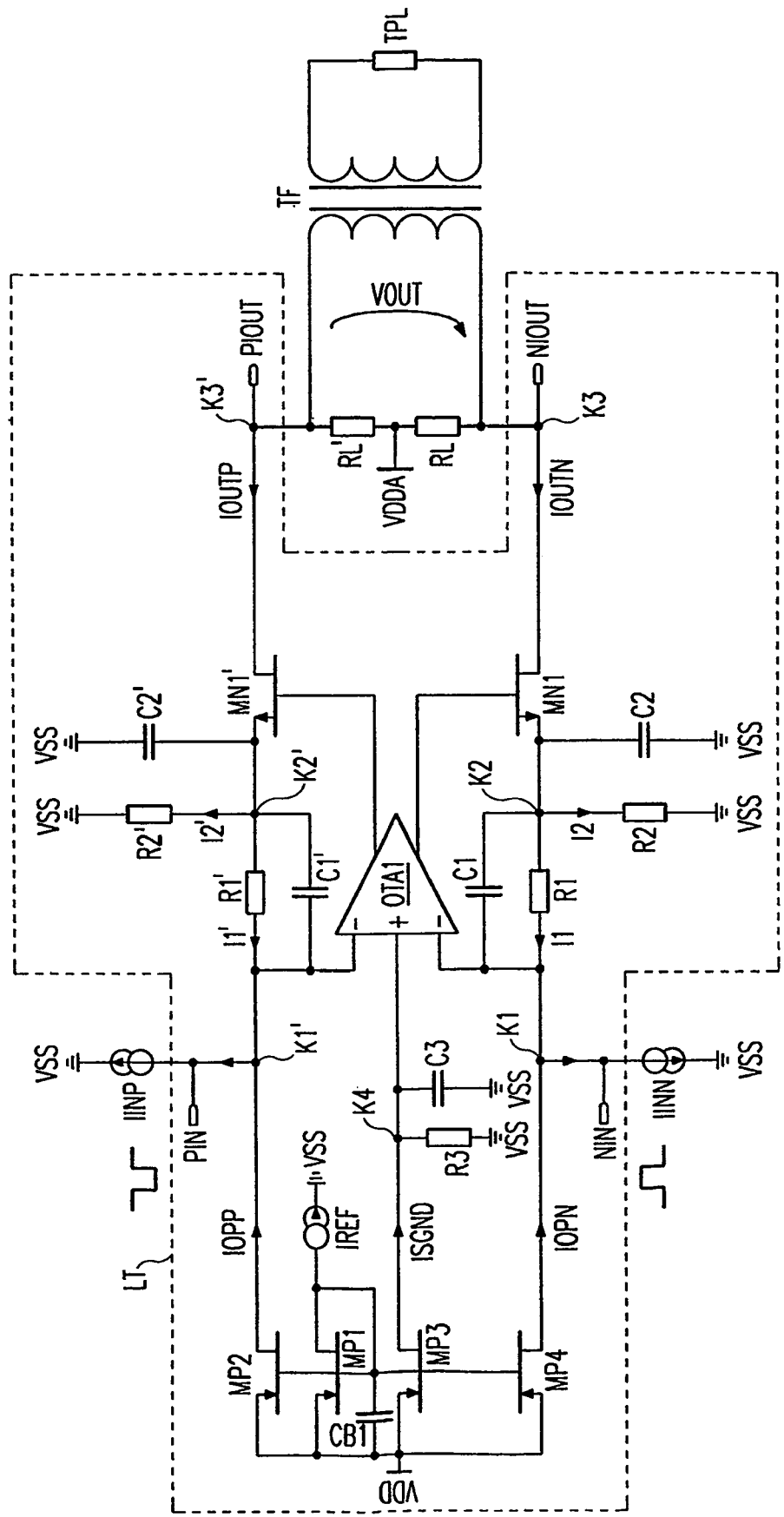
FIG. 7 shows a circuit diagram of a second exemplary embodiment of the inventive pseudo-differential line driver.

FIG. 7 shows a circuit diagram of a second exemplary embodiment of the inventive pseudo-differential line driver LT. The unit OPC and the voltage-controlled current sources VCCS1 and VCCS1' are in the form of transistors MP1, MP2, MP3 and MP4 in the present exemplary embodiment. In addition, the transistors MP1, MP2, MP3 and MP4 are designed as a current bank. The input current for the current bank is provided by the constant current source IREF. The constant current source IREF feeds the transistor MP1 via the latter's drain connection. The transistor MP1 is the input transistor in the current bank. The drain connection of the transistor MP1 is connected to the latter's gate connection and also to the gate connections of the transistors MP2, MP3 and MP4. The source connections of the transistors MP1, MP2, MP3 and MP4 are coupled to a supply voltage VDD. A capacitor CB1 is connected between the gate connections of these transistors and the supply voltage VDD. The transistor MP2 uses its drain connection to feed the node K1' with the current IOPP. Similarly, the transistor MP3 or MP4 feeds the node K4 or K1 with a current ISGND or with the current IOPN.

The signal ground which is present on the node K4 is derived from the current ISGND, which is proportional to the current produced by the constant current source IREF. Hence, relatively good synchronism for the present pseudo-differential line driver LT is guaranteed. The output current IOUTN through the transistor MN1 is obtained from equation (3). The transfer function $A_i(s)$ in the frequency domain is given by equation (14).

FIG. 8 shows a circuit diagram of a third exemplary embodiment of the inventive pseudo-differential line driver LT. In the present third exemplary embodiment, the operating point is regulated, unlike in the second exemplary embodiment shown in FIG. 7. To this end, a further transconductance amplifier OTA2, further constant current sources IREFA and IREFA' and two independent current mirrors, formed by transistors MP5 and MP6 or MP5' and MP6', are implemented in the circuit.

The transistors MP5 and MP6 in one independent current mirror are connected to one another by their gate connections. Their source connections have the supply voltage VDD applied to them. The transistor MP5 is the input transistor of the current mirror and is fed at its drain connection by the constant current source IREFA. The transistor MP6 uses its drain connection to provide the current IOPN. In addition, the transconductance amplifier OTA2 likewise feeds the input of the transistor MP5 with a current IOTA2. The output side of the transconductance amplifier OTA2 produces a current IOTA2 of such magnitude that the voltage which is present on the node K2 is regulated to a reference voltage VREF. To this end, the inverting input of the transconductance amplifier OTA2 is connected to the node K2 and its noninverting input has the reference voltage VREF applied to it. A similar situation applies to the transistors MP5' and MP6', the constant current source IREFA' and a current IOTA2'.

An advantage obtained for the present exemplary embodiment is that the operating point, i.e. the current I2 through the resistor R2 and hence the output current IOUTN through the transistor MN1 in the terminating resistor RL, is regulated. The potential on the node K2 is thus equal to the reference voltage VREF, disregarding any offset. Another advantage is that the offset of the transconductance amplifier OTA1 and the resultant fault current are corrected.

The transfer response in the frequency domain of the transconductance amplifier OTA2 should be proportioned according to equation (18). The transfer response has to have a dominant pole $\omega_{fb}$. The transfer function of the present pseudo-differential line driver LT is given by equation (19).

Figure 9:
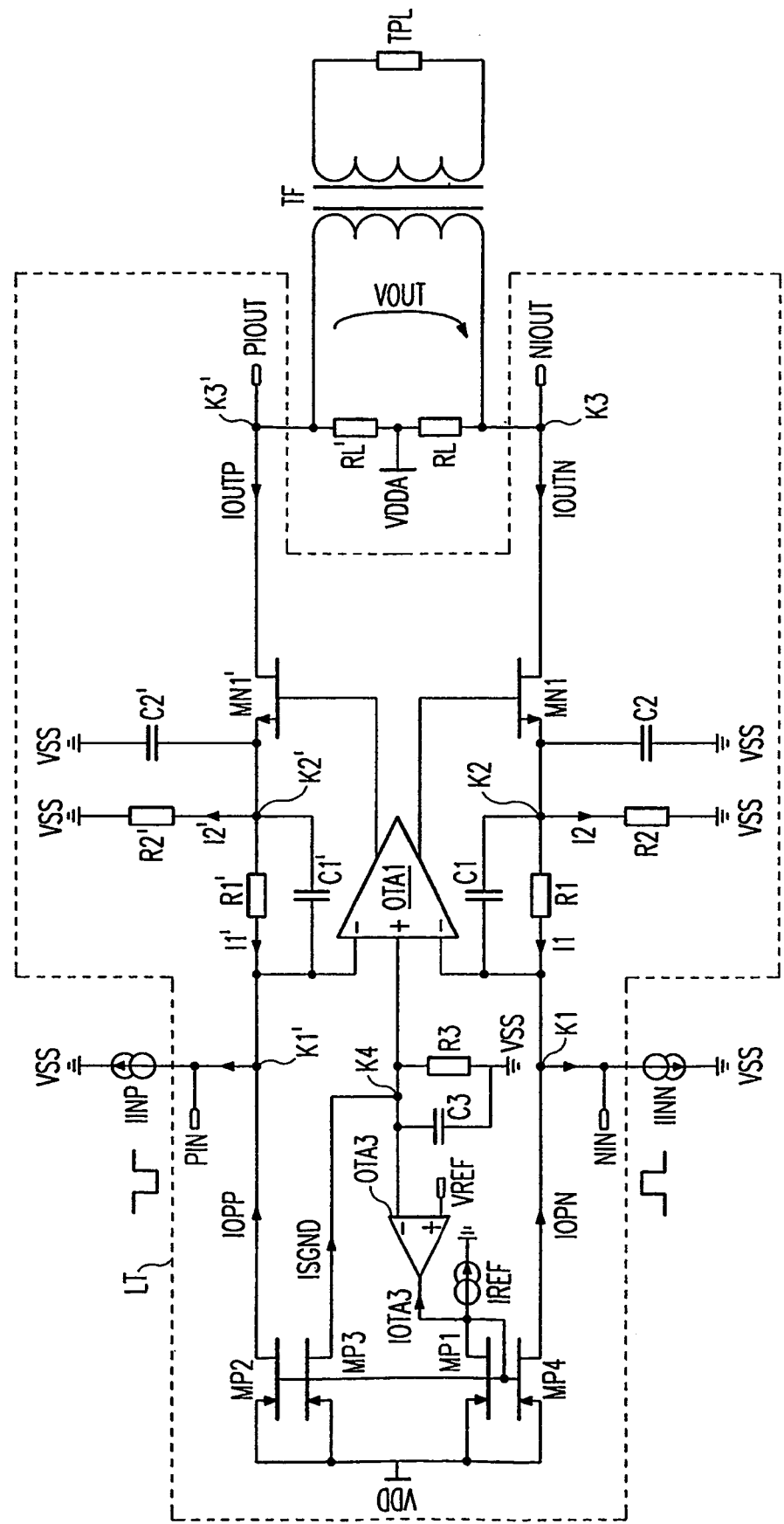
FIG. 9 shows a circuit diagram of a fourth exemplary embodiment of the inventive pseudo-differential line driver.

FIG. 9 shows a circuit diagram of a fourth exemplary embodiment of the inventive pseudo-differential line driver LT. The present circuit is based on the circuit shown in FIG. 7 for the second exemplary embodiment. In addition, in the case of the present circuit, a current IOTA3 feeds the input of the transistor MP1. The current IOTA3 is produced by a further transconductance amplifier OTA3. The inverting input of the transconductance amplifier OTA3 is connected to the node K4, in which the current ISGND generates the signal ground. The noninverting input of the transconductance amplifier OTA3 has the reference voltage VREF applied to it.

The circuit arrangement described above allows indirect regulation of the operating point. To this end, the voltage on the node K4 is compared with the reference voltage VREF using the transconductance amplifier OTA3. At the input of the current bank, the current produced by the constant current source IREF has a current IOTA3 superimposed on it which is such that the voltage on the node K4 assumes the value of the reference voltage.

The circuit shown in FIG. 9 is particularly advantageous at very high signal frequencies, since the indirect regulation of the operating point suppresses additional parasitic loads in the signal path. Such parasitic loads in the signal case could restrict the quality of the transfer characteristic.

The operating point of the present circuit becomes established according to equation (3). The transfer function in the frequency domain is given by equation (14).

FIG. 10 shows a circuit diagram of a fifth exemplary embodiment of the inventive pseudo-differential line driver LT. In this case, the currents IOPN and IOPP are again provided by a current bank which has a transistor MP7 fed by the constant current source IREF for the input and transistors MP8 and MP8' for the output. In the present exemplary embodiment, however, the current IOPN or IOPP does not feed the node K1 or K1', but rather a node K6 or K6'. The node K6 or K6' is connected to the output of the transconductance amplifier OTA1 via a resistor R5 or R5'. Connected between the node K1 or K1' and the inverting input of the transconductance amplifier OTA1 is a capacitor CC1 or CC1'. The voltage VSGND is applied to the non-inverting input of the transconductance amplifier OTA1. In addition, resistors RC1 and RC1' are coupled to the inverting inputs of the transconductance amplifier OTA1. The other connections of the resistors RC1 and RC1' have the voltage VSGND applied to them.

The node K6 or K6' is also connected to the gate connection of a transistor MN2 or MN2'. On the source connection of the transistor MN2 or MN2', a resistor R4 or R4' is connected to ground VSS. The drain connection of the transistor MN2 or MN2' is connected to the latter's gate connection. In addition, a capacitor C4 or C4' is connected to the ground VSS on the drain connection of the transistor MN2 or MN2'.

The present exemplary embodiment combines a simple current mirror for operating-point adjustment with a shunt-series feedback for current amplification. The circuit advantageously requires no regulation of the operating point using a feedback loop. In addition, the transconductance amplifier OTA1 is active via an AC coupling.

With no signal applied to the input NIN, the transistors MN1 and MN2 together form a degenerate current mirror. In this context, the degeneration resistors used are the resistors R2 and R4. As the basic current, the current produced by the constant current source IREF is mirrored into the node K6 via the current mirror formed from the transistors MP7 and MP8. The node K6 is the input of the degenerate current mirror formed from the transistors MN1 and MN2. The current IOPN drains to the ground VSS via the drain/source path in the transistor MN2 and via the resistor R4, provided that the current 15 flowing through the resistor R5 is equal to zero. The output of the transconductance amplifier OTA1 produces a potential equal to the potential on the node K6. The current through the transistor MN1 and the resistor R2 is obtained on the basis of the quotient of the gradients of the transistors MN1 and MN2. The staging ratio can be chosen according to requirements.

When the input NIN is driven with an input current IINN, the AC coupled transconductance amplifier OTA1 with the resistors R1 and R2 and the transistor MN1 acts as a shunt-series feedback with a DC current gain in accordance with equation (3). So that this involves no additional current flow into the transistor MN2, the reference path in the current mirror formed from the transistors MN1 and MN2 is decoupled via a low pass filter, which contains the resistor R5 and the capacitor C4.

The result of the AC coupling of the transconductance amplifier OTA1 by means of the capacitor CC1 or CC1' and the resistor RC1 or RC1' is an additional zero in the transfer function. Noise signals below the frequency of the zero are thus suppressed. The transfer function of the present circuit in the frequency domain is given by equation (20).

I claim:

1. A line driver for amplifying an input current into an output current comprising a drive amplifier, a voltage-controlled output current source, a current/voltage converter, a voltage/current converter, a first node, a second node and a third node, wherein
   the input current can be injected into the first node,
   a first amplifier input on the drive amplifier is coupled to the first node and a second amplifier input on the drive amplifier essentially has a reference voltage applied to it,
   the current/voltage converter, which is connected between the first node and the second node, is designed such that it converts a first current, which feeds the current/voltage converter from the first node, into a voltage which is present on the second node,
   the voltage/current converter, which is connected to the second node, is designed such that it converts the voltage present on the second node into a second current and supplies the second current to a current sink,
   a first capacitor is connected between the first node and the second node,
   the voltage-controlled output current source can be controlled by the drive amplifier, and a current-carrying path in the voltage-controlled output current source is connected between the second node and the third node, and
   the output current can be output from the third node.

2. The line driver as claimed in claim 1, wherein
   the current/voltage converter is a first resistor, and
   the voltage/current converter is a second resistor, whose first connection is connected to the second node and whose second connection has a common fixed potential, particularly a ground, applied to it.

3. The line driver as claimed in claim 2, comprising
   a second capacitor, whose first connection is coupled to the second node and whose second connection has the common fixed potential, particularly the ground, applied to it.

4. The line driver as claimed in claim 2, wherein
   the first resistor and/or the second resistor are provided by transistors in the resistance domain.

5. The line driver as claimed in claim 2, wherein
   the third node is connected to a connection on a terminating resistor and a second connection on the terminating resistor has a further common fixed potential applied to it.

6. The line driver as claimed in claim 1, wherein
   a control connection on the voltage-controlled output current source is connected to an output on the drive amplifier.

7. The line driver as claimed in claim 1, wherein
the drive amplifier is a transconductance amplifier, with, in particular, its inverting input being the first amplifier input and its noninverting input being the second amplifier input.

8. The line driver as claimed in claim 1, wherein
the voltage-controlled output current source has a MOS transistor, particularly an n-channel MOS transistor.

9. A pseudo-differential line driver for amplifying a differential total input current, comprising a first and a second input current portion, into a differential total output current, a first and a second output current portion, with a first and a second line driver wherein each line driver comprises
a drive amplifier, a voltage-controlled output current source, a current/voltage converter, a voltage/current converter, a first node, a second node and a third node, wherein
the input current can be injected into the first node,
a first amplifier input on the drive amplifier is coupled to the first node and a second amplifier input on the drive amplifier essentially has a reference voltage applied to it,
the current/voltage converter, which is connected between the first node and the second node, is designed such that it converts a first current, which feeds the current/voltage converter from the first node, into a voltage which is present on the second node,
the voltage/current converter, which is connected to the second node, is designed such that it converts the voltage present on the second node into a second current and supplies the second current to a current sink,
the voltage-controlled output current source can be controlled by the drive amplifier, and a current-carrying path in the voltage-controlled output current source is connected between the second node and the third node, and
the output current can be output from the third node, and wherein
the first node of the first line driver can have the first input current portion injected into it and the first node of the second line driver can have the second input current portion injected into it,
the third node of the first line driver can output the first output current portion and the third node of the second line driver can output the second output current portion,
the reference voltages of the first and second line drivers have the same values,
the first node of the first line driver is fed by a first controllable current source, and
the first node of the second line driver is fed by a second controllable current source, and
the first controllable current source has a first current mirror circuit and the second controllable current source has a second current mirror circuit.

10. The pseudo-differential line driver as claimed in claim 9, wherein
the second amplifier inputs of the drive amplifiers on the first and second line drivers are coupled to a fourth node, which is fed by a third controllable current source, and
the reference voltages can be derived from the current provided by the third controllable current source.

11. The pseudo-differential line driver as claimed in claim 10, comprising
a third resistor, whose first connection is coupled to the fourth node and whose second connection has the common fixed potential, particularly the ground, applied to it.

12. The pseudo-differential line driver as claimed in claim 10, comprising
a third capacitor, whose first connection is coupled to the fourth node and whose second connection has the common fixed potential, particularly the ground, applied to it.

13. The pseudo-differential line driver as claimed in claim 10, comprising
an operational amplifier which is connected up such that it regulates the voltage present on the fourth node to a further reference voltage.

14. The pseudo-differential line driver as claimed in claim 9, wherein (remainder of claim is fine).

15. The pseudo-differential line driver as claimed in claim 14, wherein
the unit for operating-point adjustment or operating-point regulation is fed by an adjustable constant current source.

16. The pseudo-differential line driver as claimed in claim 9, wherein (remainder of claim is fine).

17. The pseudo-differential line driver as claimed in claim 9, wherein (remainder of claim is fine).

18. The pseudo-differential line driver as claimed in claim 9, wherein (remainder of claim is fine).

19. The pseudo-differential line driver as claimed in claim 18, wherein
the output of the operational amplifier is connected to the in put of the common input transistor.

20. The pseudo-differential line driver as claimed in claim 19, wherein
the inverting input of the operational amplifier is coupled to the fourth node, and
the noninverting input of the operational amplifier has the further reference voltage applied to it.

21. The pseudo-differential line driver as claimed in claim 9, wherein (remainder of claim is fine).

22. The pseudo-differential line driver as claimed in claim 21, wherein
the first regulating current source has a first operational amplifier, which is a transconductance amplifier, in particular, with the input current for the first current mirror circuit being able to be controlled by the first operational amplifier such that the second node of the first line driver is at a further reference voltage, and
the second regulating current source has a second operational amplifier, which is a transconductance amplifier, in particular, with the input current for the second current mirror circuit being able to be controlled by the second operational amplifier such that the second node of the second line driver is at the further reference voltage.

23. The pseudo-differential line driver as claimed in claim 22, wherein
the inverting input of the first operational amplifier is coupled to the second node of the first line driver,
the inverting input of the second operational amplifier is coupled to the second node of the second line driver,
the noninverting inputs of the first and second operational amplifiers have the further reference voltage applied to them,
the output of the first operational amplifier is coupled to the input of the first current mirror circuit, and the output of the second operational amplifier is coupled to the input of the second current mirror circuit.

24. The pseudo-differential line driver as claimed in claim 9, wherein
the first line driver has a first controllable current source, a first further MOS transistor, a third resistor and a fourth node, wherein
the first controllable current source feeds the fourth node,
the gate connection and a first connection on the drain/source path in the first further MOS transistor are coupled to the fourth node,
the output of the drive amplifier in the first line driver is coupled to the fourth node, and
a first connection on the third resistor is coupled to a second connection on the drain/source path in the first further MOS transistor, and a second connection on the third resistor has the common fixed potential, particularly the ground, applied to it, and
the second line driver has a second controllable current source, a second further MOS transistor, a fourth resistor and a fifth node, wherein
the second controllable current source feeds the fifth node,
the gate connection and a first connection on the drain/source path in the second further MOS transistor are coupled to the fifth node,
the output of the drive amplifier in the second line driver is coupled to the fifth node, and
a first connection on the fourth resistor is coupled to a second connection on the drain/source path in the second further MOS transistor, and a second connection on the fourth resistor has the common fixed potential, particularly the ground, applied to it.

25. The pseudo-differential line driver as claimed in claim 24, wherein
the first controllable current source has a first current mirror circuit and the second controllable current source has a second current mirror circuit.

26. The pseudo-differential line driver as claimed in claim 25, wherein
the input current for the first current mirror circuit and the input current for the second current mirror circuit are provided by an adjustable constant current source.

27. The pseudo-differential line driver as claimed in claim 25, wherein
the first and second current mirror circuits have a common input transistor and, in particular, are designed from p-channel MOS transistors.

28. The pseudo-differential line driver as claimed in claim 24, wherein
the first further MOS transistor and the second further MOS transistor are n-channel MOS transistors.

29. The pseudo-differential line driver as claimed in claim 24, wherein
a third capacitor is connected between the first node of the first line driver and the first amplifier input of the drive amplifier in the first line driver, and
a fourth capacitor is connected between the first node of the second line driver and the first amplifier input of the drive amplifier in the second line driver.

30. The pseudo-differential line driver as claimed in claim 29, wherein
a fifth resistor is connected between the first and second amplifier inputs of the drive amplifier in the first line driver, and
a sixth resistor is connected between the first and second amplifier inputs of the drive amplifier in the second line driver.

31. The pseudo-differential line driver as claimed in claim 24, wherein
a first low-pass filter is connected between the fourth node and the output of the drive amplifier in the first line driver, and
a second low-pass filter is connected between the fifth node and the output of the drive amplifier in the second line driver.

32. The pseudo-differential line driver as claimed in claim 31, wherein
the first low-pass filter has a seventh resistor and a fifth capacitor, wherein
the seventh resistor is connected between the fourth node and the output of the drive amplifier in the first line driver, and
a first connection on the fifth capacitor is coupled to the fourth node and a second connection on the fifth capacitor has the common fixed potential, particularly the ground, applied to it, and
the second low-pass filter has an eighth resistor and a sixth capacitor, wherein
the eighth resistor is connected between the fifth node and the output of the drive amplifier in a second line driver, and
a first connection on the sixth capacitor is coupled to the fifth node and a second connection on the sixth capacitor has the common fixed potential, particularly the ground, applied to it.

33. The pseudo-differential line driver as claimed in claim 9, wherein
the pseudo-differential line driver can be produced using CMOS processes.

34. A line driver for amplifying an input current into an output current comprising a drive amplifier, a voltage-controlled output current source, a current/voltage converter, a voltage/current converter, a first node, a second node and a third node, wherein
the input current can be injected into the first node,
a first amplifier input on the drive amplifier is coupled to the first node and a second amplifier input on the drive amplifier essentially has a reference voltage applied to it,
the current/voltage converter is a first resistor, which is connected between the first node and the second node, and designed such that it converts a first current, which feeds the current/voltage converter from the first node, into a voltage which is present on the second node,
the voltage/current converter is a second resistor whose first connection is connected to the second node and whose second connection has a common fixed potential applied to it and is designed such that it converts the voltage present on the second node into a second current and supplies the second current to a current sink,
a first terminal of a capacitor is coupled to the second node and a second terminal of said capacitor has the common fixed potential, particularly the ground, applied to it,
the voltage-controlled output current source can be controlled by the drive amplifier, and a current-carrying path in the voltage-controlled output current source is connected between the second node and the third node, and
the output current can be output from the third node.

* * * * *